(12) United States Patent
Yahagi

(10) Patent No.: US 11,199,230 B2
(45) Date of Patent: Dec. 14, 2021

(54) CLUTCH CONTROL DEVICE

(71) Applicant: ISUZU MOTORS LIMITED, Tokyo (JP)

(72) Inventor: Shuuichi Yahagi, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 16/982,505

(22) PCT Filed: Mar. 14, 2019

(86) PCT No.: PCT/JP2019/010474
§ 371 (c)(1),
(2) Date: Sep. 18, 2020

(87) PCT Pub. No.: WO2019/181712
PCT Pub. Date: Sep. 26, 2019

(65) Prior Publication Data
US 2021/0025461 A1 Jan. 28, 2021

(30) Foreign Application Priority Data
Mar. 19, 2018 (JP) .............................. JP2018-050679

(51) Int. Cl.
*F16D 25/08* (2006.01)
*F16D 48/02* (2006.01)
(Continued)

(52) U.S. Cl.
CPC ......... *F16D 25/087* (2013.01); *F16D 25/083* (2013.01); *F16D 48/02* (2013.01);
(Continued)

(58) Field of Classification Search
CPC ............. F16D 25/087; F16D 25/00–14; F16D 25/083; F16D 48/02; F16D 48/066; F16D 2048/0275
(Continued)

(56) References Cited

U.S. PATENT DOCUMENTS 8,874,340 B2 * 10/2014 Salewski ............... F16D 48/066
701/68
10,344,809 B2 * 7/2019 Gustin ................ F16D 25/0638
(Continued)

FOREIGN PATENT DOCUMENTS

| CN | 101021236 A | 8/2007 |
|----|-------------|--------|
| CN | 101323245 A | 12/2008 |

(Continued)

OTHER PUBLICATIONS

International Search Report and Written Opinion for related JP. App. No. PCT/JP2019/010474 dated Jun. 11, 2019. English translation provided; 6 pages.
(Continued)

*Primary Examiner* — Timothy Hannon
(74) *Attorney, Agent, or Firm* — Procopio, Cory, Hargreaves & Savitch LLP

(57) ABSTRACT

This clutch control device is provided with: a first valve; a second valve; a valve control unit configured to control the operation of each of the first valve and the second valve; an operation determination unit configured to perform an operation determination for the clutch device; and an initial operation completion determination unit which determines whether an initial operation of the clutch device has been completed. The valve control unit, if it is determined by the operation determination unit that an on-off switching process is required, subjects both the first valve and the second valve to opening-control. If it is determined by the initial
(Continued)

operation completion determination unit that the initial operation has been completed, the valve control unit subjects the second valve to closing-control.

5 Claims, 4 Drawing Sheets

(51) Int. Cl.
 *F16D 48/06* (2006.01)
 *F16D 121/06* (2012.01)

(52) U.S. Cl.
 CPC .... *F16D 48/066* (2013.01); *F16D 2048/0221* (2013.01); *F16D 2048/0275* (2013.01); *F16D 2121/06* (2013.01); *F16D 2500/1045* (2013.01); *F16D 2500/10412* (2013.01); *F16D 2500/1107* (2013.01)

(58) Field of Classification Search
 USPC ....................................................... 192/85.08
 See application file for complete search history.

(56) References Cited

U.S. PATENT DOCUMENTS

| 2009/0291802 | A1 | 11/2009 | Herrmann et al. |
| 2010/0016119 | A1 | 1/2010 | Petzold et al. |
| 2014/0136067 | A1 | 5/2014 | Salewski |
| 2019/0186563 | A1 | 6/2019 | Takeuchi et al. |

FOREIGN PATENT DOCUMENTS

| CN | 101943227 A | | 1/2011 | |
| CN | 106812934 A | | 6/2017 | |
| DE | 102006035134 A1 | | 1/2010 | |
| GB | 1383567 A | * | 2/1974 | ............. F16D 48/02 |
| JP | 2007024277 A | | 2/2007 | |
| JP | 2012002236 A | | 1/2012 | |
| JP | 2016023668 A | | 2/2016 | |
| KR | 2009-0088867 A | | 11/2009 | |
| WO | 2018038216 A1 | | 3/2018 | |

OTHER PUBLICATIONS

Chinese Office Action, Application No. 201980020438.7, dated Jul. 20, 2021, in 14 pages.

* cited by examiner ered in the cylinder, and the clutch actuator including a pressure chamber formed in
CLUTCH CONTROL DEVICE

CROSS-REFERENCE TO RELATED APPLICATIONS

This application is a U.S. National Stage entry of PCT Application No. PCT/JP2019/010474, filed on Mar. 14, 2019, which claims priority to JP Application No. 2018-050679, filed Mar. 19, 2018. The contents of the foregoing are incorporated by reference.

TECHNICAL FIELD

The present disclosure relates to a clutch control device configured to control disengagement and engagement of a clutch device by controlling supply and discharge of a working fluid to and from a clutch actuator.

BACKGROUND ART

There is known a technology in which a clutch, that is, a clutch device is arranged between an engine and a transmission mechanism, and disengagement and engagement of the clutch device is controlled so as to control transmission of a driving force between the engine and the transmission mechanism. Further, there is also known a technology of controlling disengagement and engagement of a clutch device using a fluid (working fluid) such as air or hydraulic oil.

For example, Patent Literature 1 discloses a clutch device in which disengagement and engagement is controlled by controlling supply and discharge of a working fluid to and from a cylinder chamber (that is, a pressure chamber) of a clutch actuator. In the clutch device, a return spring is provided between the one end portion of a clutch disc and a mechanical automatic transmission so as to urge the clutch disc. Then, when a working fluid is sent into the cylinder chamber of the clutch actuator, a release fork is urged in a first direction as a piston of the clutch actuator moves, and as a result, the engagement of the clutch device is disengaged, that is, disconnected against the urging force of the return spring. On the other hand, when the working fluid in the cylinder chamber of the clutch actuator is discharged, the release fork is urged in a second direction opposite to the first direction by the urging force of the return spring, and the engagement of the clutch device is connected.

CITATION LIST

Patent Literature

Patent Literature 1: JP-A-2012-2236

SUMMARY OF INVENTION

Technical Problem

In the clutch device described above, a spring member having a hysteresis characteristic is sometimes used. For example, in a case where a diaphragm spring is used in the clutch device described above, when the engagement of the clutch device in a disengagement state is changed from the disengaged state to an engagement state, the behavior of the diaphragm spring in an elastically deformed state may be affected by the hysteresis. Such an effect may lead to a delay in an initial operation of the piston in the clutch device as described above.

On the other hand, for example, in the clutch device described above, when the engagement of the clutch device in the engagement state is changed into the disengagement state from the engagement state, a flow path of the working fluid to the cylinder chamber may not be sufficiently filled with the working fluid, that is, the working fluid may be released. In such a case, there may be a delay in the initial operation of the piston after a valve is controlled to supply the working fluid. Such a delay in the initial operation reduces the responsiveness in controlling the clutch device.

Therefore, the technology of the present disclosure provides a clutch control device capable of improving responsiveness at a time of starting a disengagement and engagement switching process of a clutch device.

Solution to Problem

A technology of the present disclosure provides a clutch control device configured to control switching between disengagement and engagement of a clutch device by adjusting an urging force of an elastic member to a clutch member in the clutch device, the urging force being adjusted by controlling movement of a piston of a clutch actuator, and the clutch actuator including a pressure chamber formed in a cylinder, and the piston provided movably in the cylinder in accordance with pressure of a working fluid in the pressure chamber, the clutch control device including: a first valve provided to adjust the pressure of the working fluid in the pressure chamber; a second valve provided to adjust the pressure of the working fluid in the pressure chamber; a valve control unit configured to control operation of each of the first valve and the second valve; an operation determination unit configured to perform an operation determination of the clutch device; and an initial operation completion determination unit configured to determine whether an initial operation of the clutch device is completed when the control is started by the valve control unit, in which the valve control unit is configured to: perform opening control on both the first valve and the second valve when it is determined by the operation determination unit that a disengagement and engagement switching process of the clutch device is necessary; and perform closing control on the second valve when it is determined by the initial operation completion determination unit that the initial operation of the clutch device is completed.

The clutch control device includes: a first supply valve for controlling supply of the working fluid to the pressure chamber; and a second supply valve for controlling the supply of the working fluid to the pressure chamber, in which the valve control unit may include a first supply valve control unit configured to control operation of the first supply valve, and a second supply valve control unit configured to control operation of the second supply valve; and when it is determined by the operation determination unit that the disengagement and engagement switching process of the clutch device by supplying working fluid to the pressure chamber is necessary, both the first supply valve and the second supply valve may be subjected to the opening control, and when it is determined by the initial operation completion determination unit that the initial operation of the clutch device is completed, the second supply valve may be subjected to the closing control while the first supply valve is kept open.

The clutch control device includes: a first discharge valve for controlling discharge of the working fluid in the pressure chamber; and a second discharge valve for controlling the discharge of the working fluid in the pressure chamber, in which the valve control unit may include a first discharge valve control unit configured to control operation of the first discharge valve, and a second discharge valve control unit configured to control operation of the second discharge valve; and when it is determined by the operation determination unit that the disengagement and engagement switching process of the clutch device by discharging the working fluid from the pressure chamber is necessary, both the first discharge valve and the second discharge valve may be subjected to the opening control, and when it is determined by the initial operation completion determination unit that the initial operation of the clutch device is completed, the second discharge valve may be subjected to the closing control while the first discharge valve is kept open.

Advantageous Effects of Invention

According to the above technology of the present disclosure, with the above configuration, it is possible to improve responsiveness at a time of starting a disengagement and engagement switching process of a clutch device.

DESCRIPTION OF EMBODIMENTS

Figure 1:
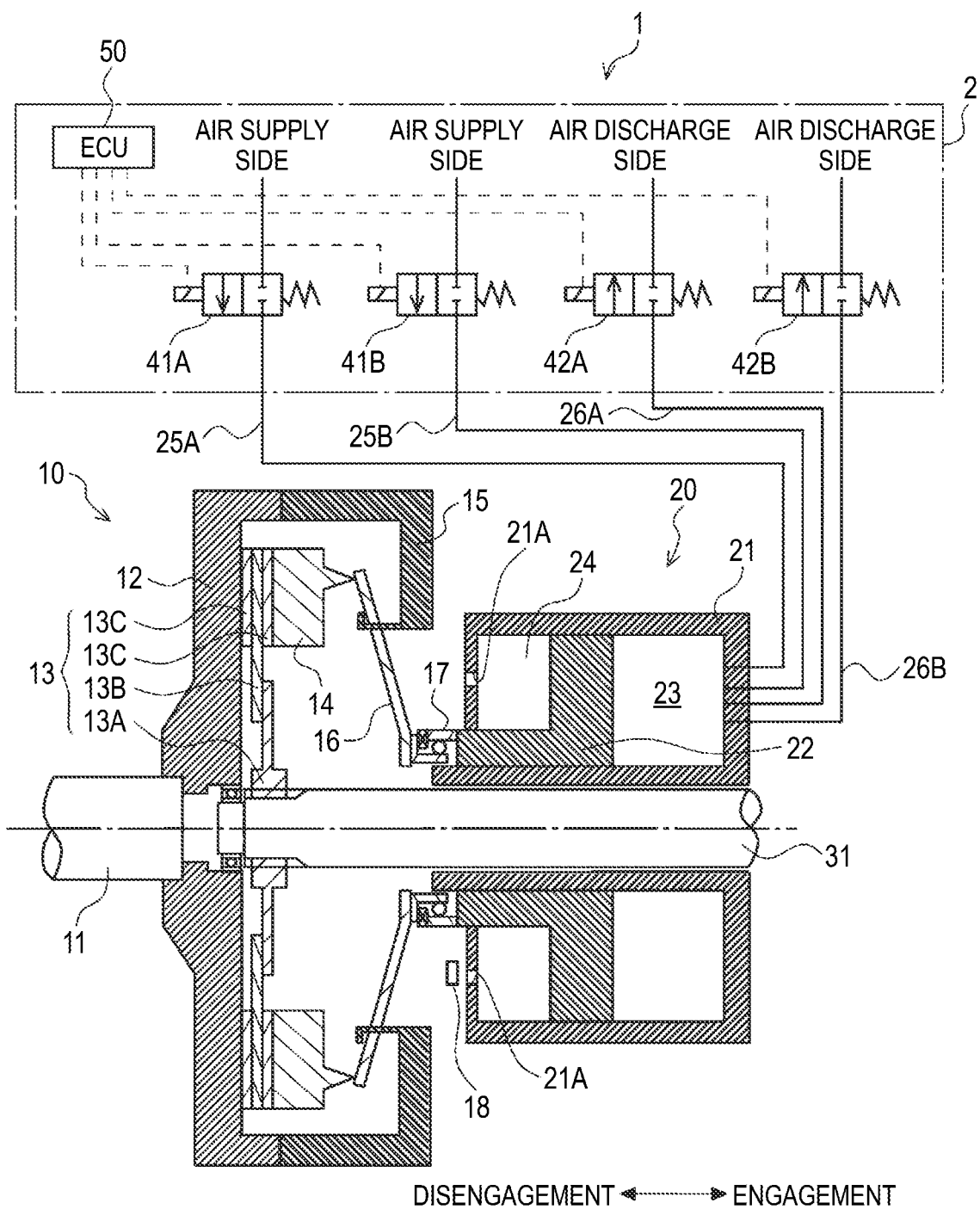
FIG. 1 is a schematic configuration diagram of a clutch system to which a clutch control device according to an embodiment of the present disclosure is applied.
Figure 2:
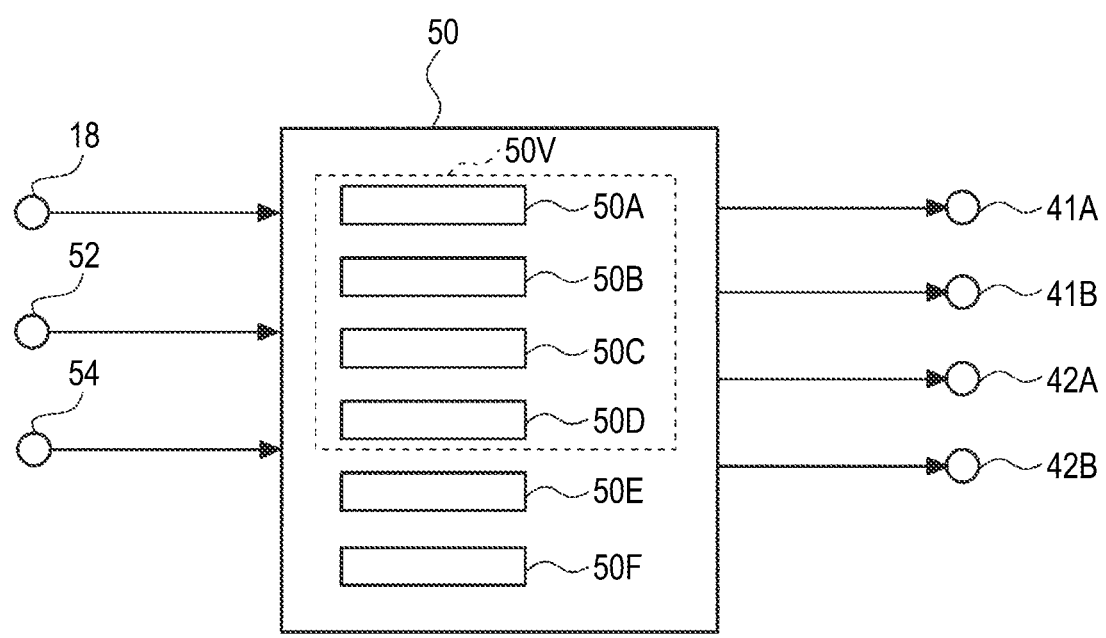
FIG. 2 is a block diagram of a control device in the clutch system of FIG. 1.

Hereinafter, an embodiment according to the present disclosure is described with reference to the drawings. The same components are denoted by the same reference numerals, and names and functions of these components are also the same. Therefore, detailed descriptions of the same components are not repeated.

FIG. 1 is a schematic configuration diagram of a clutch system 1 including a clutch control device 2 according to an embodiment of the technology of the present disclosure.

The clutch system 1 includes a clutch device 10, a clutch actuator 20, the clutch control device 2, and a stroke sensor 18.

The clutch device 10 includes a flywheel 12, a clutch disc 13, a pressure plate 14, a clutch cover 15, a diaphragm spring 16, and a release bearing 17. The clutch disc 13 configures a clutch member, and the diaphragm spring 16 is a spring member, that is, an elastic member.

The flywheel 12 is integrally rotatably connected to a crankshaft 11 to which a driving force of an engine (not shown) is transmitted. The clutch cover 15 is fixed to an outer peripheral edge of the flywheel 12 on a side opposite to the crankshaft 11.

The clutch disc 13 includes a mounting portion 13A which is arranged coaxially with the crankshaft 11 and is spline-fitted to an input shaft 31 of a transmission (not shown) so as to be axially movable and integrally rotatable, an annular disc main body portion 13B fixed to an outer peripheral portion of the mounting portion 13A, and friction plates 13C fixed on both sides of an outer edge portion of the disc main body portion 13B.

The pressure plate 14 is arranged on the clutch disc 13 on a side opposite to the flywheel 12 so as to be able to contact the friction plate 13C. The diaphragm spring 16 is arranged such that an outer edge portion thereof is able to contact a surface of the pressure plate 14 on the side opposite to the flywheel 12, and therefore, when the pressure plate 14 is pressed by the diaphragm spring 16, the clutch disc 13 can be pressed against the flywheel 12. When not being pressed by the diaphragm spring 16, the pressure plate 14 is moved to the side opposite to the flywheel 12 by a spring (not shown), so that the clutch disc 13 is not pressed against the flywheel 12.

The diaphragm spring 16 is a substantially conical spring member in a state with no load, and an intermediate portion of the diaphragm spring 16 between an inner edge portion and the outer edge portion is attached to the clutch cover 15. The outer edge portion of the diaphragm spring 16 is arranged so as to come into contact with the pressure plate 14 on the side opposite to the flywheel 12, and the inner edge portion of the diaphragm spring 16 is arranged so as to come into contact with a surface of the release bearing 17 on a flywheel 12 side.

In the present embodiment, when the release bearing 17 does not press the inner edge portion of the diaphragm spring 16 toward the flywheel 12 side, the outer edge portion of the diaphragm spring 16 presses the pressure plate 14 toward the flywheel 12, so that the clutch disc 13 is pressed against the flywheel 12, that is, the clutch device 10 is brought into an engagement state. In short, the diaphragm spring 16 is configured to act by exerting an urging force on the clutch member 13. On the other hand, when the release bearing 17 presses the inner edge portion of the diaphragm spring 16 toward the diaphragm spring 12 side, the outer edge portion of the diaphragm spring 16 moves toward the side opposite to the flywheel 12, and the outer edge portion of the diaphragm spring 16 does not press the pressure plate 14, so that the clutch disc 13 is not pressed against the flywheel 12, that is, the clutch device 10 is brought into a disengagement state. In short, in this way, the urging force applied from the diaphragm spring 16 to the clutch disc 13 serving as the clutch member is eliminated.

The release bearing 17 is configured such that a flywheel 12 side of an inner ring contacts the inner edge portion of the diaphragm spring 16, and a side opposite to the flywheel 12 of an outer ring is connected to a piston 22 of the clutch actuator 20 described later, so that the diaphragm spring 16 and the piston 22 are rotatable relative to each other, and the release bearing 17 is movable in an axial direction of the input shaft 31 as the piston 22 moves in the axial direction.

The clutch actuator 20 has a cylinder 21 arranged so as to be relatively rotatable around the input shaft 31, and a piston 22 provided inside the cylinder 21 so as to be movable in the axial direction. A pressure chamber 23 is formed by a surface of the piston 22 on the side opposite to the flywheel 12 and an inner wall of the cylinder 21, and an open chamber 24 is formed by an outer peripheral surface of the piston 22, a surface of the piston 22 on the flywheel 12 side, and the inner wall of the cylinder 21. The pressure chamber 23 may be referred to as a cylinder chamber.

The cylinder 21 is provided with supply pipes 25A and 25B for supplying air (an example of a working fluid) into the pressure chamber 23 and discharge pipes 26A and 26B for discharging the air from the pressure chamber 23. Here, since air is used as the working fluid, the supply pipe 25 may be referred to as an air supply pipe, and the discharge pipes 26A and 26B may be referred to as an air discharge pipe. Further, the cylinder 21 is formed with an opening hole 21A for communicating the open chamber 24 with the outside (for example, the outside under atmospheric pressure).

According to the clutch actuator 20, by supplying air into the pressure chamber 23, the piston 22 can be moved toward the flywheel 12 side, and the clutch device 10 can be brought into the disengagement state. On the other hand, by discharging air from the pressure chamber 23, the piston 22 can be moved toward the side opposite to the flywheel 12 by an elastic force of the diaphragm spring 16, and the clutch device 10 can be brought into the engagement state.

The clutch control device 2 includes a first supply valve 41A and a second supply valve 41B arranged in parallel between a supply side for supplying air (air supply side in FIG. 1) and the supply pipes 25A, 25B, a first discharge valve 42A and a second discharge valve 42B arranged in parallel between a discharge side for discharging air (air discharge side in FIG. 1) and the discharge pipes 26A, 26B, and a control device including a functional unit configured to control these valves 41A, 41B, 42A, and 42B separately. The control device corresponds to an electronic control unit (ECU) 50. That is, the ECU 50 includes a valve control unit 50V configured to control the operation of each of those valves. The valve control unit 50V includes a first supply valve control unit 50A configured to control operation of the first supply valve 41A, a second supply valve control unit 50B configured to control operation of the second supply valve 41B, a first discharge valve control unit 50C configured to control operation of the first discharge valve 42A, and a second discharge valve control unit 50D configured to control operation of the second discharge valve 42B. Further, the ECU 50 includes an operation determination unit 50E (a functional unit corresponding to the operation determination unit) configured to make an operation determination of the clutch device 10. The operation determination of the clutch device 10 made by the operation determination unit 50E includes determination of whether it is necessary to perform an engagement process of the clutch device 10, that is, a clutch engagement process, determination of whether to end the clutch engagement process, determination of whether it is necessary to perform an disengagement process of the clutch device 10, that is, a clutch disengagement process, and determination of whether to end the clutch disengagement process. Further, the ECU 50 includes (a functional unit corresponding to) an initial operation completion determination unit 50F configured to determine whether the initial operation of the clutch device 10 is completed when the control by the valve control unit 50V is started. These functional units are associated with each other. Although not shown, compressed air having a predetermined pressure or higher is stored by a pump drive in the tank at a position different from the supply pipes 25A, 25B side of the supply valves 41A, 41B in FIG. 1.

The ECU 50 includes a known arithmetic device (for example, a central processing unit (CPU)), a storage device (for example, read only memory (ROM), random access memory (RAM)), an input/output port and the like, and has a so-called computer configuration. Here, the ECU 50 is provided with a functional unit as a control device of the clutch system 1. Although the ECU 50 also includes various functional units for the control of the engine, the control of the transmission and the like, the ECU 50 may not include such functional units. Hereinafter, the functional unit serving as the control device of the clutch system 1 is described, and the description of other functional units is omitted.

The stroke sensor 18 is connected to the ECU 50, and the output thereof is input to the ECU 50. The stroke sensor 18 is provided to detect a movement amount of the piston 22 of the clutch actuator 20 from a predetermined reference position, that is, a stroke value. Based on the output of the stroke sensor 18, the ECU 50 can acquire the stroke value of the piston 22. Various sensors, for example, a vehicle speed sensor 52 for detecting a vehicle speed, and an accelerator opening degree sensor 54 for detecting an amount of depression of an accelerator pedal operated by the driver, that is, an accelerator opening degree are connected to the ECU 50 so that the outputs thereof are input. The ECU 50 can acquire the vehicle speed based on the output of the vehicle speed sensor 52, and can acquire the accelerator opening degree based on the output of the accelerator opening degree sensor 54. Although not shown, the ECU 50 is also connected to an engine rotation speed sensor for detecting an engine rotation speed, but the illustration thereof is omitted.

Under the control of the ECU 50, each of the supply valves 41A and 41B can be switched between a state in which the supply side and the pressure chamber 23 are communicated with each other to supply air (supply state), and a state in which the supply side and the pressure chamber 23 are shut off to stop the air supply (supply stopped state). Further, under the control of the ECU 50, each of the discharge valves 42A and 42B can be switched between a state in which the discharge side and the pressure chamber 23 are communicated with each other to discharge air (discharge state), and a state in which the discharge side and the pressure chamber 23 are shut off to stop the air discharge (discharge stopped state). Here, the operation of each of these valves 41A, 41B, 42A, 42B is controlled by so-called duty control by the ECU 50.

Next, control of the clutch device 10 by the clutch control device 2 in the clutch system 1 according to the present embodiment will be described.

Figure 3:
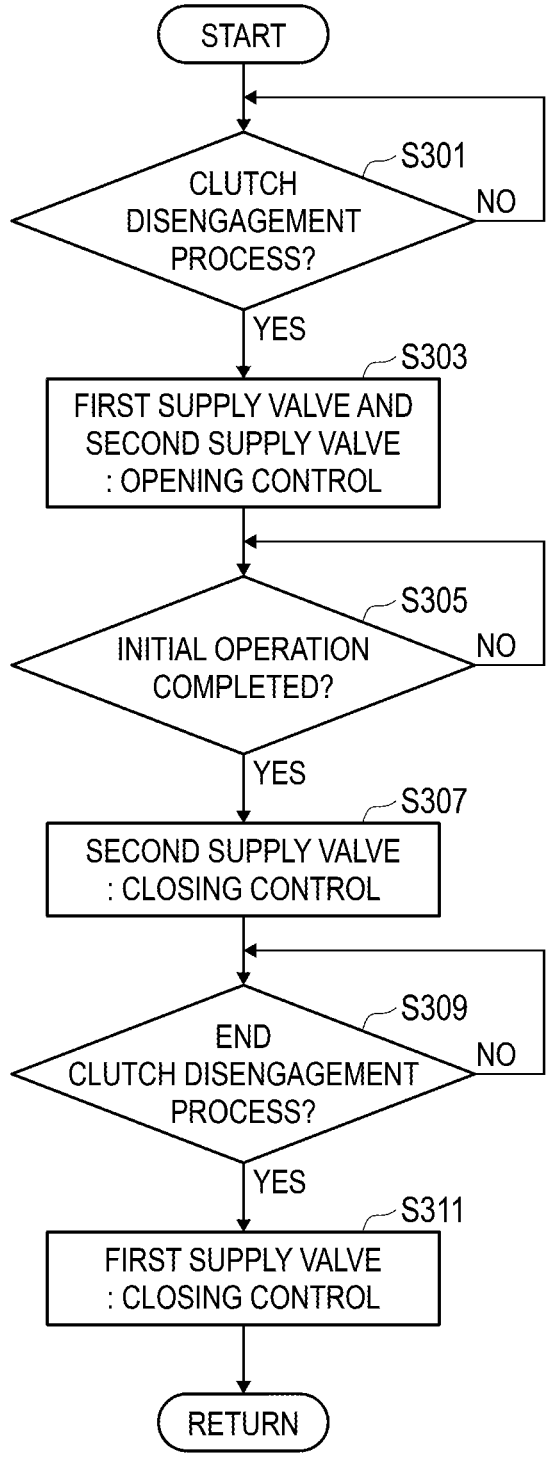
FIG. 3 is a flowchart of clutch disengagement process control in the control device of FIG. 2.

FIG. 3 is a flowchart of the clutch disengagement process according to the present embodiment. The clutch disengagement process is a process performed when the clutch device 10 is in the engagement state.

The calculation and control according to a routine of the clutch disengagement process of FIG. 3 is started, for example, when the power of the vehicle is turned on (a key switch of an ignition switch is turned on).

A clutch operation determination unit 50E which is the operation determination unit determines whether it is necessary to start the clutch disengagement process in order to perform gear shift by the transmission, based on a vehicle speed acquired based on the output from the vehicle speed sensor 52, and an accelerator opening degree acquired based on the output from the accelerator opening degree sensor 54, and the like (step S301). When the determination result is that (the start of) the clutch disengagement process (one of disengagement and engagement switching process of the clutch device 10) is necessary (YES in step S301), the process proceeds to step S303. On the other hand, when the determination result is that it is not necessary to start the clutch disengagement process (NO in step S301), step S301 is executed again.

When receiving from the clutch operation determination unit 50E the output of the determination result that the clutch disengagement process is necessary, the valve control unit 50V in particular, the first supply valve control unit 50A and the second supply valve control unit 50B execute opening control of the corresponding first supply valve 41A and second supply valve 41B respectively so as to perform the clutch disengagement process (step S303).

Then, the initial operation completion determination unit 50F determines whether the initial operation of the clutch device 10 is completed (step S305). In this initial operation completion determination, it is determined that the initial operation is completed when the stroke value of the piston 22 acquired based on the output of the stroke sensor 18 reaches a first predetermined value in the clutch disengagement process. The first predetermined value is determined in advance as a value obtained by being shifted from a stroke value in a clutch engagement state as a basis to the side of a stroke value in a clutch disengagement state by a first predetermined distance. When it is determined that the initial operation of the clutch device 10 is completed (YES in step S305), the process proceeds to step S307. On the other hand, when the initial operation of the clutch device 10 is not completed, the determination of step S305 is repeated again.

When receiving the output that the initial operation of the clutch device 10 is completed (YES in step S305), the second supply valve control unit 50B of the valve control unit 50V performs closing control on the second supply valve 41B (step S307). As a result, the supply of air to the pressure chamber 23 is performed only in accordance with an opening degree of the first supply valve 41A. Thereafter, here, the stroke value in the clutch disengagement state is taken as a target value, and the first supply valve control unit 50B controls the first supply valve 41A such that the acquired stroke value follows the target value.

Then, the clutch operation determination unit 50E determines whether to end the clutch disengagement process, that is, determines whether the stroke value acquired based on the output from the stroke sensor 18 reaches a stroke value in a clutch disengagement state (step S309). Then, if the acquired stroke reaches the stroke value in the clutch disengagement state (YES in step S309), the clutch operation determination unit 50E outputs a signal to stop the clutch operation to the first supply valve control unit 50A and the valve control unit 50V. As a result, closing control of closing the first supply valve 41A is executed (step S311).

Figure 4:
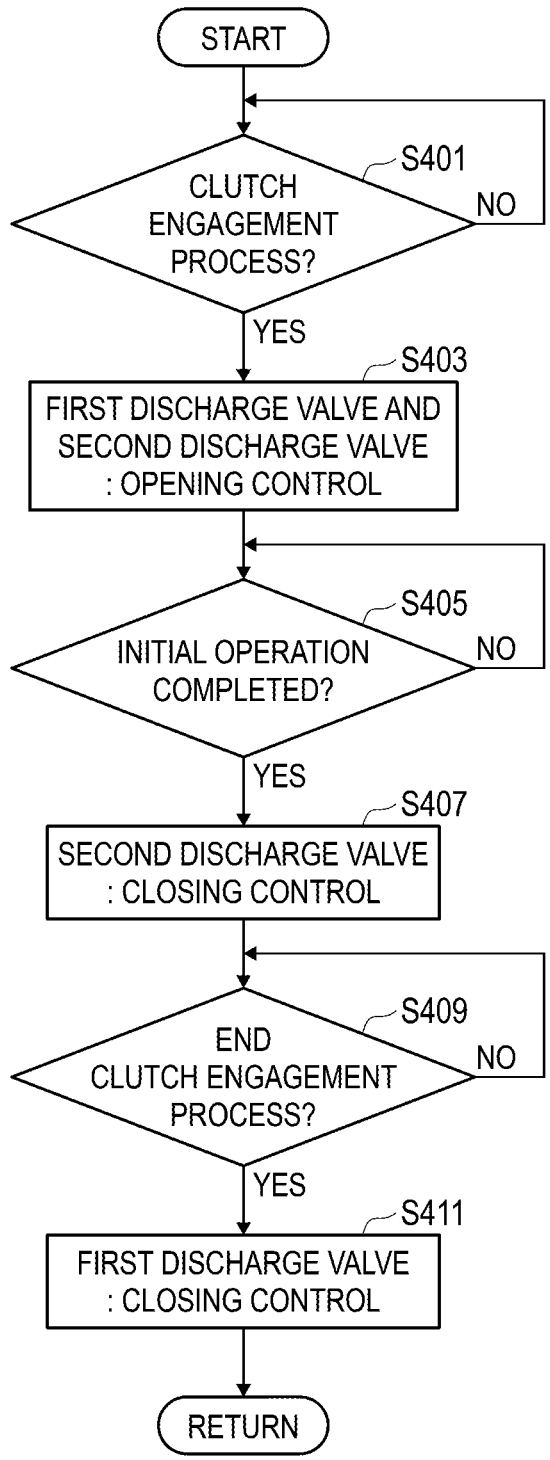
FIG. 4 is a flowchart of clutch engagement process control in the control device of FIG. 2.

FIG. 4 is a flowchart of the clutch engagement process according to the present embodiment. The clutch engagement process is a process performed when the clutch device 10 is in the disengagement state.

The calculation and control according to a routine of the clutch engagement process of FIG. 4 is started, for example, when the power of the vehicle is turned on (a key switch of an ignition switch is turned on).

The clutch operation determination unit 50E determines whether it is necessary to start the clutch engagement process (one of disengagement and engagement switching process of the clutch device 10) after the gear shift by the transmission is completed (step S401). When the determination result is that it is not necessary to start the clutch engagement process (NO in step S401), the determination step in step S401 is repeatedly executed.

When receiving from the clutch operation determination unit 50E the output of the determination result that the clutch engagement process is necessary (YES in step S401), the valve control unit 50V, in particular, the first discharge valve control unit 50C and the second discharge valve control unit 50D execute opening control of the corresponding first discharge valve 42A and second discharge valve 42B respectively so as to perform the clutch engagement process (step S403).

Then, the initial operation completion determination unit 50F determines whether the initial operation of the clutch device 10 is completed (step S405). In this initial operation completion determination, it is determined that the initial operation is completed when the stroke value of the piston 22 acquired based on the output of the stroke sensor 18 reaches a second predetermined value in the clutch engagement process. The second predetermined value is determined in advance as a value obtained by being shifted from the stroke value in the clutch disengagement state as a basis to the side of the stroke value in the clutch engagement state by a second predetermined distance. The second predetermined distance is the same as the first predetermined distance here, but the second predetermined distance may also be different the first predetermined distance. When it is determined that the initial operation of the clutch device 10 is completed (YES in step S405), the process proceeds to step S407. On the other hand, when the initial operation of the clutch device 10 is not completed (NO in step S405), the determination of step S405 is repeated again.

When receiving the output that the initial operation of the clutch device 10 is completed (YES in step S405), the second discharge valve control unit 50D of the valve control unit 50V performs closing control on the second discharge valve 42B (step S407). As a result, the discharge of air from the pressure chamber 23 is performed only in accordance with an opening degree of the first discharge valve 42A. Thereafter, here, the stroke value in the clutch engagement state is taken as a target value, and the first discharge valve control unit 50D controls the first discharge valve 42A such that the acquired stroke value follows the target value.

Then, the clutch operation determination unit 50E determines whether to end the clutch engagement process, that is, determines whether the stroke value acquired based on the output from the stroke sensor 18 reaches the stroke value in the clutch engagement state (step S409). Then, if the stroke value reaches the stroke value in the clutch engagement state, the clutch operation determination unit 50E outputs a signal to stop the clutch operation to the first discharge valve control unit 50C and the valve control unit 50V (YES in step S409). As a result, closing control of closing the first discharge valve 42A is executed (step S411).

As described above, in the present embodiment, at a time of starting the clutch disengagement process (when the piston is in a stopped state), the two supply valves 41A, 41B are opened, and then the supply valves 41B of the valves is closed when the initial operation is completed. In this way, by opening more supply valves especially at the time of starting the clutch disengagement process, the working fluid can be quickly supplied to the pressure chamber 23, and the pressure thereof can be quickly increased, so that the responsiveness at the time of starting the clutch disengagement process can be improved. On the other hand, in the present embodiment, at a time of starting the clutch engagement process (when the piston is in a stopped state), the two discharge valves 42A, 42B are opened, and then the discharge valve 42B of the valves is closed when the initial operation is completed. In this way, by opening more discharge valves especially at the time of starting the clutch engagement process, the working fluid can be quickly discharged from the pressure chamber 23, and the pressure thereof can be quickly decreased, so that the responsiveness at the time of starting the clutch engagement process can be improved.

In the above embodiment, the stroke value of the piston 22 is detected, and determination is made based on the stroke value, so as to control various valves. This is because the stroke value of the piston has a correlation with the internal pressure of the working fluid in the pressure chamber 23. Therefore, instead of the stroke sensor 18, a pressure sensor for detecting the internal pressure of the pressure chamber 23 may be provided, and the valves may be controlled based on the internal pressure based on the output of the pressure sensor. Alternatively, the ECU 50 may estimate the internal pressure of the pressure chamber based on the acquired stroke value.

Further, in the above embodiment, two supply valves and two discharge valves are provided, but the number of the valves may be three or more. In this case, at the initial operation stage of the disengagement and engagement switching process of the clutch device 10, such as the clutch disengagement process and the clutch engagement process, it is preferable that a larger number of valves are subjected to the opening control than thereafter.

The present disclosure is not limited to the above-described embodiment, and can be appropriately modified and implemented without departing from the scope of the present disclosure.

For example, in the above embodiment, the clutch system 1 is configured such that the clutch device 10 is brought into the disengagement state by supplying the working fluid to the pressure chamber 23 of the cylinder 21 of the clutch actuator 20, and the clutch device 10 is brought into the engagement state by discharging the working fluid. However, the technology of the present disclosure is not limited to this, and the clutch system may also be configured such that the clutch device is brought into the engagement state by supplying the working fluid to the pressure chamber of the cylinder of the clutch actuator, and the clutch device is brought into the disengagement state by discharging the working fluid from the pressure chamber. That is, the diaphragm spring 16 may be provided so as to generate an urging force in a direction to bring the clutch member into the engagement state as in the above embodiment, or conversely, may be provided so as to generate an urging force in a direction to bring the clutch member into the disengagement state.

Further, in the above embodiment, although detailed description of the valve control is omitted, feedforward control or feedback control may be executed as the valve control. For example, the opening degree of the valve in an open state may be finely adjusted and controlled so that the stroke value detected based on the output of the stroke sensor 18 matches, that is, follows the target value. Further, PID control may be performed as feedback control.

Further, in the above embodiment, the example in which air is used as the working fluid is shown, but the technique of the present disclosure is not limited to this, and hydraulic oil may be used as the working fluid.

The present application is based on Japanese Patent Application (No. 2018-050679) filed on Mar. 19, 2018, contents of which are incorporated herein as reference.

INDUSTRIAL APPLICABILITY

According to the present disclosure, it is possible to improve responsiveness at a time of starting a disengagement and engagement switching process of a clutch device.

REFERENCE SIGNS LIST

1 clutch system
2 clutch control device
10 clutch device
11 crankshaft
12 flywheel
13 clutch disc
14 pressure plate
15 clutch case
16 diaphragm spring
17 release bearing
18 stroke sensor
20 clutch actuator
21 cylinder
22 piston
23 pressure chamber
24 open chamber
31 input shaft
41A first supply valve
41B second supply valve
42A first discharge valve
42B second discharge valve
50 ECU (control device)

The invention claimed is:

1. A clutch control device configured to control switching between disengagement and engagement of a clutch device by adjusting an urging force of an elastic member to a clutch member in the clutch device, the urging force being adjusted by controlling movement of a piston of a clutch actuator, and the clutch actuator including a pressure chamber formed in a cylinder, and the piston provided movably in the cylinder in accordance with pressure of a working fluid in the pressure chamber, the clutch control device comprising:
   a first valve provided to adjust the pressure of the working fluid in the pressure chamber;
   a second valve provided to adjust the pressure of the working fluid in the pressure chamber; and
   an electronic control unit configured to:
      control operation of each of the first valve and the second valve;
      perform an operation determination of the clutch device; and
      determine whether an initial operation of the clutch device is completed when the control of each of the first valve and the second valve is started,
   wherein the controlling of the operation of each of the first valve and the second valve by the electronic control unit includes:
      performing opening control on both the first valve and the second valve when it is determined by the electronic control unit that a disengagement and engagement switching process of the clutch device is necessary; and
      performing closing control on the second valve when it is determined by the electronic control unit that the initial operation of the clutch device is completed.

2. The clutch control device according to claim 1, wherein the clutch control device comprises:
   a first supply valve for controlling supply of the working fluid to the pressure chamber; and
   a second supply valve for controlling the supply of the working fluid to the pressure chamber,
   wherein the electronic control unit is configured to:
      control operation of the first supply valve; and
      control operation of the second supply valve, and
   wherein, when it is determined by the electronic control unit that the disengagement and engagement switching process of the clutch device by supplying working fluid to the pressure chamber is necessary, both the first supply valve and the second supply valve are subjected to the opening control, and when it is determined by the electronic control unit that the initial operation of the clutch device is completed, the second supply valve is subjected to the closing control while the first supply valve is kept open.

3. The clutch control device according to claim 2,
wherein the first valve is a first discharge valve and the second valve is a second discharge valve;
wherein the clutch control device comprises:
   the first discharge valve for controlling discharge of the working fluid in the pressure chamber; and
   the second discharge valve for controlling the discharge of the working fluid in the pressure chamber,
wherein the electronic control unit is configured to:
   control operation of the first discharge valve; and
   control operation of the second discharge valve, and
wherein, when it is determined by the electronic control unit that the disengagement and engagement switching process of the clutch device by discharging the working fluid from the pressure chamber is necessary, both the first discharge valve and the second discharge valve are subjected to the opening control, and when it is determined by the electronic control unit that the initial operation of the clutch device is completed, the second discharge valve is subjected to the closing control while the first discharge valve is kept open.

4. The clutch control device according to claim 1,
wherein the clutch control device comprises:
   a first discharge valve for controlling discharge of the working fluid in the pressure chamber; and
   a second discharge valve for controlling the discharge of the working fluid in the pressure chamber,
wherein the electronic control unit is configured to:
   control operation of the first discharge valve; and
   control operation of the second discharge valve, and
wherein, when it is determined by the electronic control unit that the disengagement and engagement switching process of the clutch device by discharging the working fluid from the pressure chamber is necessary, both the first discharge valve and the second discharge valve are subjected to the opening control, and when it is determined by the electronic control unit that the initial operation of the clutch device is completed, the second discharge valve is subjected to the closing control while the first discharge valve is kept open.

5. A clutch control device configured to control switching between disengagement and engagement of a clutch device by adjusting an urging force of an elastic member to a clutch member in the clutch device, the urging force being adjusted by controlling movement of a piston of a clutch actuator, and the clutch actuator including a pressure chamber formed in a cylinder, and the piston provided movably in the cylinder in accordance with pressure of a working fluid in the pressure chamber, the clutch control device comprising:
   a first valve provided to adjust the pressure of the working fluid in the pressure chamber;
   a second valve provided to adjust the pressure of the working fluid in the pressure chamber;
   a valve control unit configured to control operation of each of the first valve and the second valve;
   an operation determination unit configured to perform an operation determination of the clutch device; and
   an initial operation completion determination unit configured to determine whether an initial operation of the clutch device is completed when the control is started by the valve control unit,
wherein the valve control unit is configured to:
   perform opening control on both the first valve and the second valve when it is determined by the operation determination unit that a disengagement and engagement switching process of the clutch device is necessary; and
   perform closing control on the second valve when it is determined by the initial operation completion determination unit that the initial operation of the clutch device is completed.

* * * * *